Figure 1:
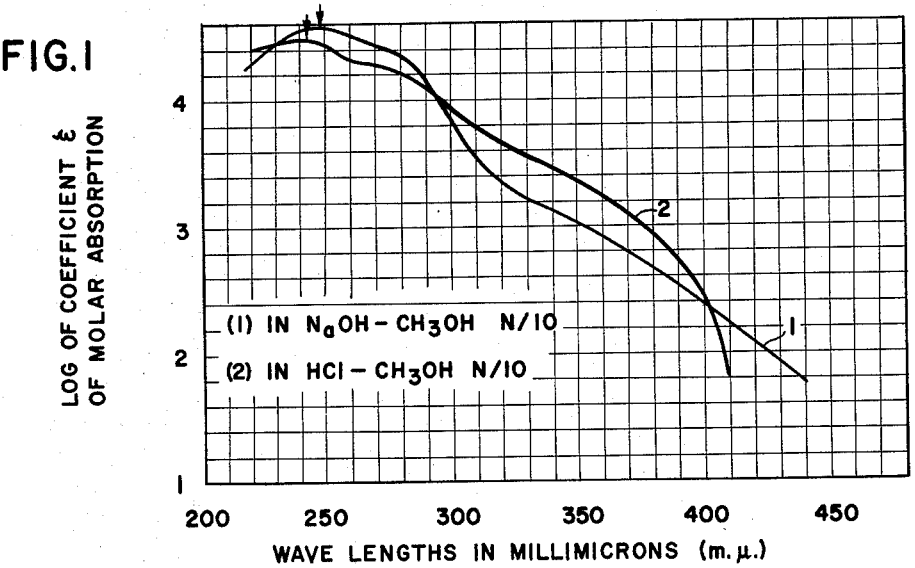

ULTRA-VIOLET SPECTRUM OF FLAVENSOMYCIN

3,093,543
ANTIBIOTIC, FLAVENSOMYCIN, AND PROCESS FOR PREPARING IT

Renato Craveri and Giovanni Giolitti, Milan, Italy, assignors to Montecatini Società Generale per l'Industria Mineraria e Chimica, Milan, Italy
Filed Dec. 13, 1961, Ser. No. 159,049
Claims priority, application Italy Sept. 19, 1956
14 Claims. (Cl. 167—65)

This application is a continuation-in-part of our application Serial No. 684,497, filed September 17, 1957.

This invention relates to a new antibiotic and to the method of obtaining the same.

The importance of antibiotics which formerly were used exclusively for therapeutic purposes but today are also applied in other fields with satisfactory results, is known.

We have now found that an actinomycete, cultivated in suitable liquid nutrients media, produces an antibiotic substance which can be extracted from the broth or culture medium by means of suitable methods.

For this new antibiotic substance which is formed during growth and propagation of the actinomycete and whose physical, chemical and biological characteristics are different from any of the antibiotics hitherto disclosed, the name "Flavensomycin" has been proposed and this name will be used throughout this application whenever reference is made to this new antibiotic.

Flavensomycin has been recovered from the culture broth of a Streptomyces isolated from a farm soil in Cavour, Piemonte, Italy, which belongs to the chromogene species. This Streptomyces has been named *Streptomyces cavourensis* and is identified as strain No. 829.8.52.

The vegetative mycelium thereof is formed by long, thin, branched or heaped hyphae, while the aerial mycelium consists of long, straight and wavy hyphae which slowly change into long conidiophores carrying roundish conidia which are not grouped in bush.

The following table illustrates the culture characteristics of Streptomyces 829:

This Streptomyces can be grown by conventional culture methods, including surface and submerged cultures, but preferably the latter. The culture media must contain carbohydrates, a suitable nitrogen source and mineral salts. The culture fermentation can be carried out at a temperature between 24° and 32° C. and depends on the aeration, agitation and composition of the nutrient medium; maximum yields are usually obtained from the fourth to the seventh day of fermentation.

During the fermentation, the pH increases to 7.8–8.0 and is then preferably kept at this level.

The culture broth remaining, after removal of the Streptomyces growth, contains various materials, such as residual nutrient elements, products of mycelium lysis and the antibiotic which can reach a concentration of 1600 units/cc. and more, depending upon the culture medium and the fermentation conditions.

Flavensomycin can be extracted from the culture broth, preferably at a pH between 7.5 and 8.5, by means of various water-immiscible solvents, such as ether, chloroform, butanol, ethyl acetate, gasoline, benzene, etc.

The volume of the extract containing the crude antibiotic is reduced by concentration in vacuum, operating at temperatures between 20° and 30° C.

The purification of the crude antibiotic extract can be carried out in two different ways after preparing a concentrated benzene solution thereof:

(a) Chromatographically by means of passing the crude extract through a column of aluminum oxide, washing carefully with benzene in order to remove fat and an inactive yellow-red colored fraction, washing with ethyl acetate to eliminate an inactive yellow fraction, and, finally, with absolute methanol to elute the antibiotic.

(b) The crude extract is precipitated with petroleum ether, the precipitate is dissolved in acetone, re-precipitated with petroleum ether, dissolved in benzene and chromatographically purified on aluminum oxide. The column is washed with benzene, ethyl acetate and the antibiotic eluted with absolute methanol. Flavensomycin is recovered from the alcohol solution by solvent evapora-

TABLE I
Culture Characteristics (at 27° C.) of Streptomyces cavourensis

| Medium | vegetative mycelium | aerial mycelium | soluble pigment | biochemical characteristics |
|---|---|---|---|---|
| Czapek's agar | abundant, yellowish | abundant, chalky | absent | |
| meat agar | abundant, orange-maroon | poor, white-yellowish from dirty white to gray-yellowish | light maroon | |
| glucose-agar | abundant, wrinkled-maroon | abundant, white-yellowish | dark maroon | |
| potato-agar | abundant, dark maroon | abundant, gray with dark yellowish spots | brown | |
| asparagine-glycerol-agar | abundant, wrinkled, hazel-colored | poor, white | do | |
| oats agar | abundant, wrinkled, light maroon | abundant, wrinkled, gray with maroon spots | light maroon | |
| starch agar | poor, from yellow to brownish | poor, chalky white-yellowish | brownish | starch highly hydrolyzed. |
| calcium maleate agar | poor, yellow-brownish | poor, white spots | light, from yellow to light brown | |
| gelatin | poor, wrinkled, brown | poor, gray | brownish | liquefied gelatin: 1 cm. after 10 days. |
| Roux's potato | abundant, wrinkled, maroon with yellow periphery | abundant, grayish | light maroon | |
| milk | dirty white | absent | yellow orange | coagulates milk after 4 days. |
| meat broth | abundant, annular, colorless after 10 days, yellowish after 30 days, clear broth with cotton-like flakes | poor, white slowly growing along the walls of the flask | light maroon | |
| glucose broth | abundant, etc.; see meat broth | absent | absent and very poor | |
| nitrate broth | poor | do | do | nitrates are not reduced to nitrites. | tion. It constitutes a crystalline, lemon-yellow colored powder.

The following example is presented to illustrate but in no way to limit the scope of the present invention:

EXAMPLE

The *Streptomyces cavourensis* strain No. 829 is grown on an agar-asparagine-glycerol medium at 27° C. which produces excellent spore growth. The production size medium is inoculated either directly with spores or with an inoculum consisting of a 24-hour old submerged Streptomyces culture, grown at 27° C. on the same medium.

Each fermentation flask contains:

| | |
|---|---|
| Maltose | g 20 |
| Peptone | g 5 |
| Corn steep water extract | g 2.5 |
| Tap water | liters 1 |

The pH is adjusted to 7.0 with NaOH and the flasks incubated at 27–28° C. for about seven days. At the end of this period, the pH has increased to 7.5–8.5.

Upon completion of the fermentation, the mycelium is removed and the antibiotic extracted by shaking the broth three times with benzene, at a ratio of 3:1, making sure that the pH remains thereby between 7.5 to 7.8. Under these conditions, Flavensomycin dissolves in benzene.

The solvent extract is reduced in volume by vacuum concentration, operating within a temperature range from 20° to 40° C.; the last traces of water are removed by this operation.

Purification is carried out by chromatographically passing the residue through an $Al_2O_3$-column charged with benzene.

(1) The antibiotic is adsorbed together with a yellow-red fraction while the fat fractions and red-violet pigments are not absorbed. The column is washed repeatedly with benzene, then with ethyl acetate which elutes an inactive yellow fraction, and finally with absolute methanol which removes the active fraction (Flavensomycin). Some red, inactive fractions, which can be eluated with acetone and water, remain in the column.

(2) The antibiotic is precipitated from concentrated benzene extract by means of petroleum ether, the precipitate is dissolved in acetone and re-precipitated with petroleum ether. The yellow-red pigmented fractions and fatty fractions which are not adsorbed in the aluminum oxide column thus require a very thorough washing of the column with benzene and are almost completely removed by this method.

The precipitate is dissolved in benzene and passed through an aluminum oxide column. The column, after washing with benzene and ethyl acetate, is eluated with absolute methanol which removes the active fraction.

Flavensomycin is separated from the alcohol solution by evaporating the solvent and is recovered as a lemon-yellow crystalline powder which is slightly hygroscopic and odorless.

The new antibiotic has the following chemical and physical characteristics:

The antibiotic has been prepared in various stages or states of purity. The product prepared as described above comprised 2.11% nitrogen. The antibiotic contains neither sulfur nor halogens. It has a clear lemon-yellow color which varies neither in alkaline nor in acid medium. The infrared absorption spectrum indicates the presence of: OH, CH, CO, conjugated CO, conjugated double bond, and phenyl; although the presence of the latter group and of conjugated CO is not certain.

Flavensomycin is excellently soluble in solvents such as methanol, ethanol, propylene glycol, pyridine; soluble in some alcohols such as N-propanol, N-butanol, amyl alcohol; soluble in glacial acetic acid, the methyl, ethyl, propyl and butyl ester thereof, in acetone, chloroform, dioxane and benzene and also in water. The antibiotic is insoluble in glycerol, carbon tetrachloride, carbon disulfide, sulfuric ether, hexane, gasoline, Vaseline oil.

An aqueous solution of Flavensomycin is best obtained by dissolving the powder in a solvent, up to 0.2 g./cc. in, say, ethanol, and adding water. The solution is foaming.

Flavensomycin gives colored reaction with Molisch, Fehling and Ehrlich reagents; no colored reactions occur and Seliwanoff, Tollens, Millon, Liebermann, Sakaguchi reagents and with biuret. A precipitate forms without colored reaction upon the addition of $FeCl_3$.

Flavensomycin is stable when stored in vacuum as a dry powder or as solutions in organic solvents. In aqueous solutions, particularly at low concentrations, it tends to lose part of its activity and it has been noted that the antibiotic is inactivated more quickly at pH 8–10 than at pH 6–4.

An aqueous solution of 100 mcg./cc. at neutral pH, kept at 18° C., loses about 40% of its activity after three days. An aqueous solution of 1 mg./cc. at neutral pH, stored at 4° C., is unchanged after seven days. The activity of the same solution is reduced to one-hundredth after six hours at 70° C. and after thirty minutes at 100° C.

Light seems to have little or no influence on the inactivation process. Highest stability in aqueous solution occurs at pH 6.3–7.

Flavensomycin has essentially an antifungal action and is particularly active on yeasts of the Saccharomyces type and on the filamentary fungi of the penicillium genus. It is not active on Schizomycetes at concentrations lower than 100 mcg./cc.

The following table shows the antibiotic spectrum of Flavensomycin. Experimental conditions: aqueous solutions of the antibiotic, prepared from 10% ethanol solutions, diluted in agar.

TABLE II

*Antibiotic Spectrum of Flavensomycin*

[Culture medium: malt agar. Growth temperature 27° C. Results recorded after 48 hours]

| Microorganisms tests | concentration causing complete inhibition (mcg./cc.) | Microorganisms tests | concentration causing complete inhibition (mcg./cc.) |
|---|---|---|---|
| Saccharomyces cerevisiae | 0.5 | Penicillium Chrysogenum Q 176 | 0.05 |
| Saccharomyces ellipsoideus | 0.5 | Penicillium 350 Signa | 0.5 |
| Saccharomyces carlsbergensis | 0.1 | Penicillium sp. (ins. from leather) | 1 |
| Candida albicans | 20 | | |
| Candida pelliculosa | >20 | Penicillium sp. (ins. from wood) | 3 |
| Monilia candida | >20 | Aspergillus niger | 20 |
| Kloeckera brevis W 203 | 20 | Aspergillus glaucus | 20 |
| Cryptococcus neoformans | 20 | Alternaria tenuis | 5 |
| Torula utilis | >20 | | |
| Torula neoformans | 20 | Fusarium lycopersici | >50 |
| Torulopsis glabrata | 7.5 | Rhizopus tritici | >50 |
| Torulopsis histolytica | 20 | Cercospora acetosella | >50 |
| | | Tricophyton mentagrophytes | 50 |
| Oidium ludwigi | 20 | Endothia parasitica | 5 |
| | | Sporotrichium bourmanti | >50 |

In addition to its strong antifungal action, Flavensomycin also shows substantial insecticidal activity. The following table illustrates this insecticidal activity, determined by means of topical application to the domestic fly.

TABLE III

*Insecticidal Activity of Flavensomycin*

| Dose/fly | Percent mortality after 20 h. | Percent mortality after 48 h. | $DL_{50}$ |
|---|---|---|---|
| 0.4 | 98 | 99 | |
| 0.2 | 83 | 89 | at 20 h.—0.128. |
| 0.15 | 62 | 80 | at 40 h.—0.094. |
| 0.1 | 29 | 55 | |

The toxicity of Flavensomycin has been determined on white mice by means of intraperitoneal injection: $LD_{50}=1$ mg./kg.; $LD_0=350$ mcg./kg.

Injected subcutaneously: $LD_{50}=2$ mg./kg.; $LD_0=1$ mg./kg. Chronic toxicity by intraperitoneal injection: $LD_0=250$ mcg./kg. each day for ten days. Oral toxicity: $LD_{50}=25$ mg./kg. acute (in methanol water); in propylene glycol-water $LD_{50}=19$ mg./kg.

The purification procedure (2) described in the above example is suplemented as follows:

Raw Flavensomycin obtained by precipitation with petroleum ether from the concentrate in benzene is redissolved in a very small quantity of benzene (40 to 50 cc. for 6 to 8 g. raw Flavensomycin) and charged onto a column having a height of 600 mm. and a diameter of 30 mm. prepared from alumina according to Brockmann (basic grade I) (250 gr.).

At first elution with benzene is effected (1000 cc.) which separates red and yellow colored fractions, which are inactive, and then with 1000 cc. ethyl acetate which separates other inactive or scarcely active fractions.

Flavensomycin is eluted with methanol up to exhaustion of the activity. In the column remain residues of Flavensomycin which can be eluted with aqueous methanol.

Methyl alcohol containing Flavensomycin is brought to dryness, treated again with acetone (which dissolves Flavensomycin leaving insoluble an inactive white fraction which is discarded), while the dried acetone gives a sufficiently pure Flavensomycin.

A further purification can be carried out by dissolving Flavensomycin, obtained as described (8 g.), in 40 cc. benzene (after having kept it for 40 hours in anhydrous methanol at room temperature) and charging the benzenic solution in column containing neutral alumina having grade 3,5 (the column having a diameter of 600 mm. and containing 260 g. $Al_2O_3$).

Chromatography is carried out with benzene containing 2% methanol (300 cc., which remove white inactive fractions), with benzene containing 3% methanol (300 cc., which elute an inactive yellow fraction), with benzene containing 4% methanol, which elutes other traces of impurities.

Finally by elution with benzene containing 5% methanol, Flavensomycin mixed with some impurities is eluted with the first 75 cc., while with the following 300 cc. a very Flavensomycin is eluted (4.5 g.).

The elution is continued with benzene having higher methanol concentrations, and then with pure methanol, thus eluting other fractions containing still Flavensomycin but mixed with impurities.

The elemental analysis of a purer product is as follows:

C=63.73%
H=8.04%
N=2.27%
O=calculated by the difference from 100%

The molecular weight of the antibiotic is 351.43. Its empirical formula is $C_{38}H_{58}N_2O_{10}$.

The differentiation of *Streptomyces cavourensis* is supplemented as follows:

The differences over related species of Streptomyces will be self-evident to persons skilled in this field. We tabulate such differences as follows:

According to Waksman-Lechevalier's classification (Guide to the Classification and Identification of the Actinomycetes and Their Antibiotics, William & Wilkins, Baltimore) Streptomyces N. 829 (the number in Waksman's Collection is 3758) seems to be close to the following species of Streptomyces: *S. griseus, S. aureus, S. antibioticus, S. tanashiensis*, but it differs from them especially in the following properties:

*S. griseus:*
    Nitrate reduction positive, Streptomycin production
    No spirals (Waksman)
    Presence of tuft-like masses of sporulating hyphae

*S. aureus:*
    Nitrate reduction positive
    Milk: no coagulation, doubtful peptonisation
    Czapek: brown pigment
    Luteomycin or fungicidine production

*S. antibioticus:*
    Milk: no coagulation
    Sporophores in clusters
    No spirals
    Actinomycin production

*S. tanashiensis:*
    Czapek: yellowish pigment
    Hyphae almost straight
    Luteomycin production Morphological characters of *S. cavourensis*:

Hyphae: straight as well as turning, sometimes bundled (especially on Czapek); numerous connections between two hyphae, by tips or lateral approaching of the hyphae.

Spirals: present in nutrient broth, from thread-shaped to hook-shaped left as well as right turning, absent in Czapek.

Spores: spherical to oval, no clusters or bushes. Tufts of sporulating hyphae absent.

The strain *Streptomyces cavourensis* (N. 829 of the Research Laboratory of Antibiotics of Milan Linate) has been deposited at the Institute of Microbiology, Rutgers University, under the number W. 3758, and at Northern Regional Research Laboratory, Peoria, under the number NRRL 2740.

This strain is also indexed at Commonwealth Micrological Institute, Kew, Surrey, under the Number 70852 and at the National Collection of Industrial Bacteria, Teddington, Middlesex, under the Number 8918.

The degree of toxicity of Flavensomycin does not preclude or contra-indicate its use as insecticide because its toxicity is not of a higher order than that of other insecticides which have found wide application, such as phosphoric esters, and because residues of Flavensomycin can be easily washed off vegetable matter, and even altered.

Toxicity was determined on white mice (*Mus musculus*) each having a weight of 20 g. and nourished with a complete standard diet.

Acute and chronic toxicity was determined as follows: The Flavensomycin was dissolved in hydro-alcoholic vehicle at various concentrations, the inoculation being intraperitoneal.

Controls were carried out with the hydro-alcoholic vehicle at the same concentration, and given through the same way, in order to test whether the solvent is harmless.

Each test was carried out on lots constituted each of five mice, and repeated many times.

To determine the acute toxicity only one inoculation of the antibiotic, at different concentrations, was employed. To determine chronic toxicity, one inoculation per day for ten days was administered.

Acute oral toxicity was determined by tests on groups each consisting of 20 mice, the antibiotic being supplied in hydro-alcoholic solution or in propylene glycol-water.

The controls were treated with only solvent solution at the same concentration.

INSECTICIDAL ACTIVITY OF FLAVENSOMYCIN

Aphicide activity by contact (on *Aphis fabae*): LD 95=0.2% active substance after 24 hours Acaricidal activity by contact (on *Tetranychus telarius*): LD 95=0.082% active substance after 24 hours Ovicidal activity (on eggs of *Tetranychus telarius*): LD 95=0.36% after six days Insecticidal activity by means of topical application to domestic fly (*Musca domestica*): LD 50=0.19 mcg. fly after 24 hours, 0.15 mcg. fly after 40 hours Insecticidal activity by tarsi contact (on *Musca domestica*): LD 50=35 mg. per m.$^2$ after 20 hours.

FIG. 1 illustrates the ultraviolet absorption spectrum of Flavensomycin. On the abscissa are the wave lengths in millimicrons (m$\mu$). On the ordinate axis are the logarithms of the coefficients $\epsilon$, of molar absorption. Curve 1 is a graph of data obtained with an alkaline solution, namely in an NaOH—CH$_3$OH, N/10 solution. Curve 2 was obtained with an acid solution, namely in HCl—CH$_3$OH, N/10 solution. In the acid solution, a maximum is present at 243 m$\mu$, the log $\epsilon$ being 4.50. In the alkaline solution the said maximum is shifted to 249 m$\mu$, the log $\epsilon$ being 4.59.

Figure 2:
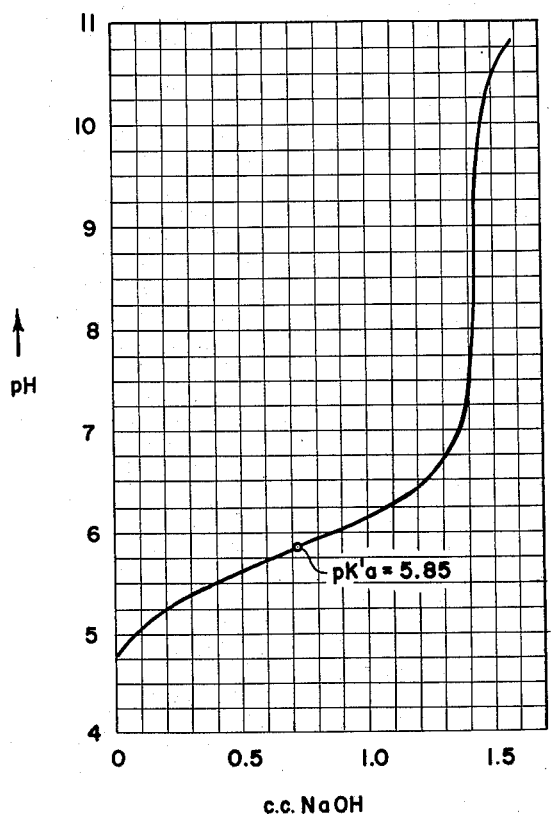

FIG. 2 is a potentiometric titration curve of Flavensomycin in aqueous ethanol (3 ethanol:1 water). The pH is shown on the ordinate axis, and the cc. NaOH on the abscissa.

Figure 3:
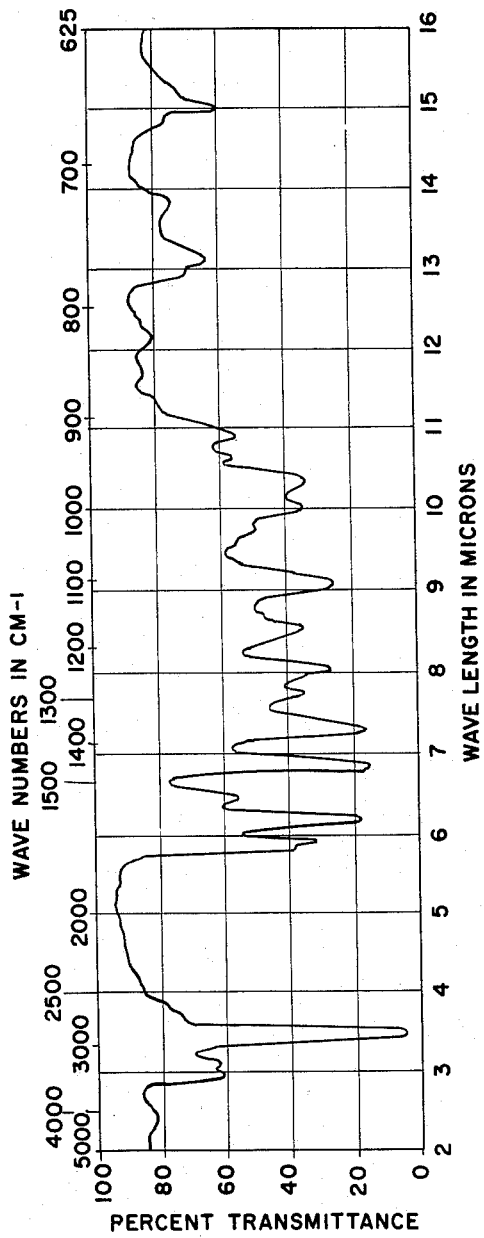

FIG. 3 shows the infrared spectrum of Flavensomycin in a Nujol suspension. Nujol is the trademark of the Plough Company for refined petroleum oil. On the abscissa are reported the wave lengths (and frequencies) and on the ordinate the percent transmittance. Minima of transmittance are noted at 2.96; 3.10; 5.80; 5.93; 6.20; 7.76; 8.04; 8.54; 9.09; 9.75; 10.00; 10.36; 10.64; 10.91; 13.10$\mu$.

Figure 4:
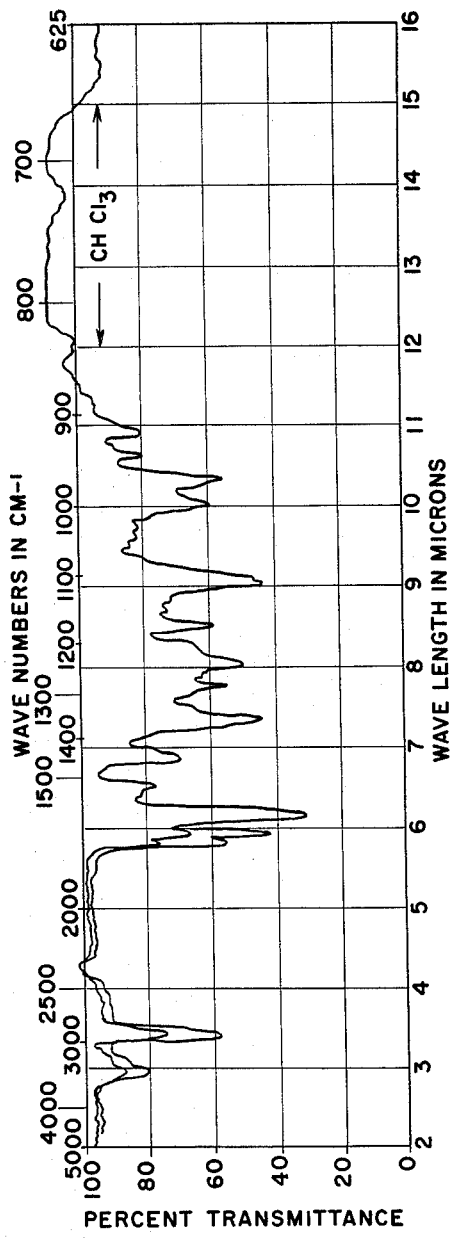

FIG. 4 presents on the same scale as FIG. 3, the infrared spectrum of Flavensomycin in chloroform solution. Minima of transmittance are present at 3.00; 3.10; 5.82; 5.93; 6.16; 6.53; 7.76; 8.04; 8.54; 9.02; 9.09; 9.75; 10.02; 10.33; 10.64; 10.90$\mu$.

We claim:

1. The antibiotic Flavensomycin, the molecular weight of which is 351.43; having the empirical formula C$_{38}$H$_{58}$N$_2$O$_{10}$; which gives color reactions with Molisch, Fehling, and Ehrlich reagents; gives no color reactions with Seliwanoff, Tollens, Millon, Liebermann, Sakaguchi reagents and with biuret; which forms a precipitate without color reaction upon addition of FeCl$_3$; is soluble in methanol, propanol, amyl alcohol, propylene glycol, chloroform, water, pyridine, acetone, methyl and butyl esters of acetic acid; is insoluble in glycerol, carbon tetrachloride, and hexane, said Flavensomycin having an infrared spectrum in petroleum oil suspension in which there are minima or transmittance at 2.96; 3.10; 5.80; 5.93; 6.20; 7.76; 8.04; 8.54; 9.09; 9.75; 10.00; 10.36; 10.64; 10.91; 13.10$\mu$, and an infrared spectrum in chloroform solution in which there are minima of transmittance at 3.00; 3.10; 5.82; 5.93; 6.16; 6.53; 7.76; 8.04; 8.54; 9.02; 9.09; 9.75; 10.02; 10.33; 10.64; 10.90$\mu$.

2. A process for the production of Flavensomycin, which comprises growing *Streptomyces cavourensis*, NRRL 2740, in contact with a liquid medium containing sources of assimilable carbon and nitrogen and also mineral salts, and extracting Flavensomycin from the culture broth with an organic water-immiscible solvent.

3. A process as defined in claim 2, in which the Flavensomycin extract is purified by concentrating the extract in vacuo, adsorbing the concentrate on aluminum oxide, removing the inactive fractions, eluting the active fraction with methanol and evaporating methyl alcohol, to obtain the dry antibiotic.

4. A process as defined in claim 2, in which the culture medium during the fermentation is kept at between 24° and 32° C. and the fermentation proceeds for about 3-7 days.

5. A process as defined in claim 2, in which, for extracting the antibiotic from the culture broth, the pH of the culture broth is adjusted to between 7.5–8.5, with alkalies.

6. A process as defined in claim 2, the culture medium comprising meat peptone, corn steep liquor, maltose, and water.

7. A process for the production of Flavensomycin, which comprises growing *Streptomyces cavourensis*, NRRL 2740, in contact with a liquid medium containing sources of assimilable carbon and nitrogen and also mineral salts, and extracting Flavensomycin from the culture broth with an organic water-immiscible solvent taken from the group consisting of ether, chloroform, butanol, ethyl acetate, gasoline, and benzene.

8. The process of producing the antibiotic Flavensomycin, which comprises incubating and aerating while submerged in a liquid medium containing sources of assimilable carbon, nitrogen and mineral salts, a culture of *Streptomyces cavourensis*, NRRL 2740, and recovering Flavensomycin from the liquid medium by extraction with benzene.

9. A process according to claim 8, wherein said culture medium consists of maltose, peptone, corn steep water extract and water.

10. A process according to claim 8, wherein the pH of the culture ranges from pH 7 to 8.5, the extraction being carried out at pH 7.5 to 7.8.

11. A process according to claim 8, wherein the Flavensomycin extract is concentrated in vacuo, the concentrate is adsorbed in an aluminum oxide column, the column thereafter washed with benzene to remove fat and an inactive yellow-red fraction, and then with ethyl acetate to remove an inactive yellow fraction, and thereafter with mehanol to elute Flavensomycin and the eluate is evaporated in vacuo to dryness.

12. A process according to claim 8, wherein Flavensomycin is precipitated from the benzene extract with petroleum ether, separated, again dissolved in benzene and adsorbed in an aluminum oxide column.

13. A process according to claim 8, wherein Flavensomycin is precipitated from the benzene extract with petroleum ether, separated, again dissolved in benzene and adsorbed in an aluminum oxide column, and eluting the column with a benzene-methanol mixture.

14. The process of producing the antibiotic Flavensomycin, which comprises incubating and aerating while submerged in a liquid medium containing sources of assimilable carbon, nitrogen and mineral salts, comprising maltose, peptone, corn steep water extract and water, a culture of *Streptomyces cavourensis* at a temperature ranging from 24 to 32° C., separating mycelium and recovering crude Flavensomycin from the liquid medium by extraction with a water-immiscible solvent.

No references cited.